(12) United States Patent
Shapiro et al.

(10) Patent No.: US 11,668,207 B2
(45) Date of Patent: Jun. 6, 2023

(54) SHROUD HANGER ASSEMBLY (71) Applicant: GENERAL ELECTRIC COMPANY, Schenectady, NY (US)

(72) Inventors: Jason David Shapiro, Lynn, MA (US); Jan Christopher Schilling, Evendale, OH (US); Michael John Franks, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 486 days.

(21) Appl. No.: 15/316,577

(22) PCT Filed: Apr. 23, 2015

(86) PCT No.: PCT/US2015/027247
§ 371 (c)(1),
(2) Date: Dec. 6, 2016

(87) PCT Pub. No.: WO2015/191169
PCT Pub. Date: Dec. 17, 2015

(65) Prior Publication Data
US 2017/0198607 A1    Jul. 13, 2017

Related U.S. Application Data

(60) Provisional application No. 62/011,231, filed on Jun. 12, 2014.

(51) Int. Cl.
*F01D 25/24* (2006.01)
*F01D 25/12* (2006.01)

(52) U.S. Cl.
CPC .......... *F01D 25/246* (2013.01); *F01D 25/12* (2013.01); *F01D 25/24* (2013.01);
(Continued)

(58) Field of Classification Search
CPC ........ F01D 25/12; F01D 25/24; F01D 25/243; F01D 25/246; F01D 25/26; F01D 25/28;
(Continued)

(56) References Cited

U.S. PATENT DOCUMENTS 3,583,824 A    6/1971    Smuland et al.
3,778,185 A    12/1973   Plowman et al.
(Continued)

FOREIGN PATENT DOCUMENTS

CA    2520792 A1    3/2006
CN    1219215 A     6/1999
(Continued)

OTHER PUBLICATIONS

A PCT Search Report and Written Opinion issued in connection with corresponding PCT Application No. PCT/US2015/027247 dated Jul. 10, 2015.

(Continued)

*Primary Examiner* — Woody A Lee, Jr.
*Assistant Examiner* — Justin A Pruitt
(74) *Attorney, Agent, or Firm* — Dority & Manning, P.A.

(57) ABSTRACT

A shroud hanger assembly or shroud assembly is provided for dimensionally incompatible components wherein the assembly includes a multi-piece hanger, for example having a forward hanger portion and a rearward hanger portion. A cavity is formed between the parts; wherein a shroud may be positioned which is formed of a low coefficient of thermal expansion material. The hanger and shroud may be formed of the same material or differing materials in order to better match the thermal growth between the hanger and the shroud. When the shroud is positioned within the hanger opening or cavity, one of the forward and rearward hanger portions may be press fit or otherwise connected into the other of the forward and rearward hanger portion.

20 Claims, 8 Drawing Sheets

(52) U.S. Cl.
CPC .... *F05D 2220/32* (2013.01); *F05D 2250/131* (2013.01); *F05D 2300/50212* (2013.01); *Y02T 50/60* (2013.01)

(58) Field of Classification Search
CPC .......... F01D 11/025; F01D 11/18; F02C 7/20; F05D 2220/32; F05D 2250/131; F05D 2300/50212
USPC ...................................................... 415/173.1
See application file for complete search history.

(56) References Cited

U.S. PATENT DOCUMENTS

| | | | |
|---|---|---|---|
| 4,087,199 A | 5/1978 | Hemsworth et al. | |
| 4,460,311 A | 7/1984 | Trappmann et al. | |
| 4,596,116 A | 6/1986 | Mandet et al. | |
| 4,759,687 A | 7/1988 | Miraucourt et al. | |
| 4,863,345 A | 9/1989 | Thompson et al. | |
| 5,048,288 A | 9/1991 | Bessette et al. | |
| 5,074,748 A | 12/1991 | Hagle | |
| 5,080,557 A | 1/1992 | Berger | |
| 5,127,793 A | 7/1992 | Walker et al. | |
| 5,137,421 A | 8/1992 | Hayton | |
| 5,154,577 A | 10/1992 | Kellock et al. | |
| 5,169,287 A | 12/1992 | Proctor et al. | |
| 5,188,507 A | 2/1993 | Sweeney | |
| 5,197,853 A | 3/1993 | Creevy et al. | |
| 5,553,999 A * | 9/1996 | Proctor | F01D 11/08 415/134 |
| 5,593,277 A | 1/1997 | Proctor et al. | |
| 5,655,876 A | 8/1997 | Rock et al. | |
| 5,738,490 A | 4/1998 | Pizzi | |
| 5,780,146 A | 7/1998 | Mason et al. | |
| 5,964,575 A | 10/1999 | Marey | |
| 6,113,349 A | 9/2000 | Bagepalli et al. | |
| 6,139,257 A * | 10/2000 | Proctor | F01D 9/04 415/115 |
| 6,164,656 A | 12/2000 | Frost | |
| 6,290,459 B1 | 9/2001 | Correia | |
| 6,315,519 B1 | 11/2001 | Bagepalli et al. | |
| 6,340,285 B1 | 1/2002 | Gonyou et al. | |
| 6,402,466 B1 | 6/2002 | Burdgick et al. | |
| 6,412,149 B1 | 7/2002 | Overberg | |
| 6,503,051 B2 | 1/2003 | Predmore | |
| 6,503,574 B1 | 1/2003 | Skelly et al. | |
| 6,699,011 B2 | 3/2004 | Cot et al. | |
| 6,702,550 B2 | 3/2004 | Darkins, Jr. et al. | |
| 6,733,233 B2 | 5/2004 | Jasklowski et al. | |
| 6,733,235 B2 | 5/2004 | Alford et al. | |
| 6,758,653 B2 | 7/2004 | Morrison | |
| 6,808,363 B2 | 10/2004 | Darkins, Jr. et al. | |
| 6,821,085 B2 | 11/2004 | Darkins, Jr. et al. | |
| 6,884,026 B2 | 4/2005 | Glynn et al. | |
| 6,887,528 B2 | 5/2005 | Lau et al. | |
| 6,893,214 B2 | 5/2005 | Alford et al. | |
| 6,942,203 B2 | 9/2005 | Schroder et al. | |
| 7,011,493 B2 | 3/2006 | Marchi et al. | |
| 7,052,235 B2 | 5/2006 | Alford et al. | |
| 7,217,089 B2 | 5/2007 | Durocher et al. | |
| 7,238,002 B2 | 7/2007 | Cairo et al. | |
| 7,270,518 B2 | 9/2007 | Barb et al. | |
| 7,278,820 B2 | 10/2007 | Keller | |
| 7,556,475 B2 | 7/2009 | Roberts, III et al. | |
| 7,563,071 B2 | 7/2009 | Campbell et al. | |
| 7,595,114 B2 | 9/2009 | Meschter et al. | |
| 7,686,577 B2 | 3/2010 | Morrison et al. | |
| 7,726,936 B2 | 6/2010 | Keller et al. | |
| 7,749,565 B2 | 7/2010 | Johnson et al. | |
| 7,753,643 B2 | 7/2010 | Gonzalez et al. | |
| 7,819,625 B2 | 10/2010 | Merrill et al. | |
| 7,871,244 B2 | 1/2011 | Marini et al. | |
| 7,908,867 B2 | 3/2011 | Keller et al. | |
| 7,950,234 B2 | 5/2011 | Radonovich et al. | |
| 7,968,217 B2 | 6/2011 | Sarrafi-Nour et al. | |
| 8,047,773 B2 | 11/2011 | Bruce et al. | |
| 8,079,807 B2 | 12/2011 | Shapiro et al. | |
| 8,118,546 B2 | 2/2012 | Morrison | |
| 8,128,350 B2 | 3/2012 | Schiavo et al. | |
| 8,167,546 B2 | 5/2012 | Shi et al. | |
| 8,246,299 B2 | 8/2012 | Razzell et al. | |
| 8,303,245 B2 | 11/2012 | Foster et al. | |
| 8,303,247 B2 | 11/2012 | Schlichting et al. | |
| 8,328,505 B2 | 12/2012 | Shi et al. | |
| 8,511,975 B2 | 8/2013 | Shi et al. | |
| 8,834,106 B2 | 9/2014 | Luczak | |
| 9,874,104 B2 | 1/2018 | David | |
| 2002/0127108 A1 | 9/2002 | Crall et al. | |
| 2003/0031557 A1 | 2/2003 | Arilla et al. | |
| 2003/0215328 A1 | 11/2003 | McGrath et al. | |
| 2004/0005216 A1 | 1/2004 | Suzumura et al. | |
| 2004/0005452 A1 | 1/2004 | Dorfman et al. | |
| 2004/0219011 A1 | 11/2004 | Albers et al. | |
| 2005/0003172 A1 | 1/2005 | Wheeler et al. | |
| 2005/0111965 A1 | 5/2005 | Lowe et al. | |
| 2005/0129499 A1 * | 6/2005 | Morris | F01D 9/04 415/1 |
| 2005/0141989 A1 | 6/2005 | Sayegh et al. | |
| 2006/0034685 A1 * | 2/2006 | Kizuka | F01D 5/081 415/191 |
| 2006/0062673 A1 * | 3/2006 | Coign | F01D 9/041 416/214 A |
| 2006/0078429 A1 | 4/2006 | Darkins, Jr. et al. | |
| 2006/0083607 A1 | 4/2006 | Synnott et al. | |
| 2006/0110247 A1 | 5/2006 | Nelson et al. | |
| 2006/0110248 A1 | 5/2006 | Nelson et al. | |
| 2006/0292001 A1 | 12/2006 | Keller et al. | |
| 2007/0031245 A1 | 2/2007 | Ruthemeyer et al. | |
| 2007/0154307 A1 | 7/2007 | Cairo | |
| 2008/0025838 A1 | 1/2008 | Marini et al. | |
| 2008/0206542 A1 | 8/2008 | Vance et al. | |
| 2009/0010755 A1 | 1/2009 | Keller et al. | |
| 2009/0053045 A1 | 2/2009 | Nowak et al. | |
| 2009/0208322 A1 | 8/2009 | McCaffrey | |
| 2009/0285675 A1 * | 11/2009 | Lewis | F01D 11/12 415/173.1 |
| 2009/0324393 A1 | 12/2009 | Gonzalez et al. | |
| 2010/0068050 A1 * | 3/2010 | Hansen | F01D 9/042 415/209.3 |
| 2011/0008163 A1 * | 1/2011 | Prentice | F01D 5/282 415/209.3 |
| 2011/0182720 A1 | 7/2011 | Kojima et al. | |
| 2011/0274538 A1 | 11/2011 | Shi et al. | |
| 2011/0293410 A1 | 12/2011 | Marusko et al. | |
| 2011/0299976 A1 | 12/2011 | Uskert | |
| 2011/0318171 A1 | 12/2011 | Albers et al. | |
| 2012/0082540 A1 | 4/2012 | Dziech et al. | |
| 2012/0107122 A1 | 5/2012 | Albers et al. | |
| 2012/0156029 A1 | 6/2012 | Karafillis et al. | |
| 2012/0171023 A1 | 7/2012 | Albers et al. | |
| 2012/0171027 A1 | 7/2012 | Albers et al. | |
| 2012/0247124 A1 | 10/2012 | Shapiro et al. | |
| 2012/0260670 A1 | 10/2012 | Foster et al. | |
| 2012/0263582 A1 | 10/2012 | Foster et al. | |
| 2012/0275898 A1 | 11/2012 | McCaffrey et al. | |
| 2013/0000324 A1 | 1/2013 | Alvanos et al. | |
| 2013/0004306 A1 | 1/2013 | Albers et al. | |
| 2013/0011248 A1 | 1/2013 | Croteau et al. | |
| 2013/0017057 A1 | 1/2013 | Lagueux | |
| 2013/0156550 A1 | 6/2013 | Franks et al. | |
| 2013/0156556 A1 * | 6/2013 | Franks | F01D 25/246 415/182.1 |
| 2013/0266435 A1 | 10/2013 | Foster et al. | |
| 2014/0255170 A1 | 9/2014 | Hillier | |
| 2014/0271144 A1 | 9/2014 | Landwehr et al. | |
| 2014/0271145 A1 | 9/2014 | Thomas et al. | |
| 2014/0294571 A1 | 10/2014 | Hillier | |
| 2014/0294572 A1 | 10/2014 | Hillier et al. | |
| 2014/0301840 A1 * | 10/2014 | Hein | F01D 9/042 415/209.3 |
| 2014/0308113 A1 | 10/2014 | Westphal et al. | |
| 2015/0016970 A1 | 1/2015 | Smith et al. | |

(56) References Cited

U.S. PATENT DOCUMENTS

| | | | |
|---|---|---|---|
| 2015/0377035 A1 | 12/2015 | Freeman et al. | |
| 2016/0265376 A1* | 9/2016 | Tsutsumi | F01D 11/003 |

FOREIGN PATENT DOCUMENTS

| | | | |
|---|---|---|---|
| CN | 1542259 | A | 11/2004 |
| CN | 102135020 | A | 7/2011 |
| EP | 0770761 | A1 | 5/1997 |
| EP | 1225309 | A1 | 7/2002 |
| EP | 1548144 | A1 | 6/2005 |
| EP | 1801361 | A1 | 6/2007 |
| EP | 2631434 | A2 | 8/2013 |
| EP | 2774905 | A1 | 9/2014 |
| FR | 2540938 | A1 | 8/1984 |
| FR | 2580033 | A1 | 10/1986 |
| FR | 2942844 | A1 | 9/2010 |
| GB | 2397102 | A | 7/2004 |
| JP | 5710710 | A | 1/1982 |
| JP | 63239301 | A | 10/1988 |
| JP | 05141270 | A | 6/1993 |
| JP | H06-341329 | A | 12/1994 |
| JP | 0913904 | A | 1/1997 |
| JP | 10103014 | A | 4/1998 |
| JP | 2002276301 | A | 9/2002 |
| JP | 2004036443 | A | 2/2004 |
| JP | 2005155626 | A | 6/2005 |
| JP | 2006105393 | A | 4/2006 |
| JP | 2007046603 | A | 2/2007 |
| JP | 2007182881 | A | 7/2007 |
| JP | 2013170578 | A | 9/2013 |
| WO | 02099254 | A1 | 12/2002 |
| WO | 03026886 | A2 | 4/2003 |
| WO | 2013163505 | A1 | 10/2013 |
| WO | 2014130762 | A1 | 8/2014 |
| WO | 2014186099 | A1 | 11/2014 |

OTHER PUBLICATIONS

A PCT Search Report and Written Opinion issued in connection with related PCT Application No. PCT/US2015/029236 dated Jul. 20, 2015.

A PCT Search Report and Written Opinion issued in connection with related PCT Application No. PCT/US2015/029342 dated Jul. 22, 2015.

A PCT Search Report and Written Opinion issued in connection with related PCT Application No. PCT/US2015/028050 dated Aug. 11, 2015.

A European Search Report and Opinion issued in connection with related EP Application No. 16155655.0 dated Aug. 1, 2016.

A U.S. Non-Final Office Action issued in connection with Related U.S. Appl. No. 14/634,060 dated May 17, 2017.

Machine Translation and Notification of Reasons for Refusal issued in connection with corresponding JP Application No. 2016-571128 dated Dec. 5, 2017.

Jonathan, D. B., et al., Cmc shroud support system, GE co-pending U.S. Appl. No. 61/824,491, filed May 17, 2013.

Jason, D. S., et al., Cmc shroud support system, GE co-pending U.S. Appl. No. 61/915,114, filed Dec. 12, 2013.

Jan., C. S., et al., Shroud hanger assembly, GE co-pending U.S. Appl. No. 62/011,237, filed Jun. 12, 2014.

Jason, D. S., Shroud hanger assembly, GE co-pending U.S. Appl. No. 62/011,241, filed Jun. 12, 2014.

Jason, D. S., et al.. Shroud hanger assembly, GE co-pending U.S. Appl. No. 62/011,244, filed Jun. 12, 2014.

Jason David Shapiro et al.

Jan Christopher Schilling et al., filed Jun. 12, 2014, U.S. Appl. No. 62/011,237.

Jason David Shapiro, filed Feb. 27, 2015, U.S. Appl. No. 14/634,060.

A PCT Search Report and Written Opinion issued in connection with related PCT Application No. PCT/US2014/035089 dated Jul. 1, 2014.

A U.S. Non-Final Office Action issued in connection with related U.S. Appl. No. 13/327,349 dated Jul. 22, 2014.

A U.S. Non-Final Office Action issued in connection with related U.S. Appl. No. 13/402,616 dated Jul. 24, 2014.

A U.S. Non-Final Office Action issued in connection with related U.S. Appl. No. 13/327,349 dated Jan. 27, 2015.

A PCT Search Report and Written Opinion issued in connection with related PCT Application No. PCT/JS2014/068490 dated Mar. 5, 2015.

A Chinese office action issued in connection with related CN Application No. 201210541477.1 dated May 12, 2015.

A Chinese office action issued in connection with related CN Application No. 201310056712.0 dated Jun. 19, 2015.

A European Search Report and opinion issued in connection with related EP Application No. 12195953.0 dated Jul. 22, 2015.

A Chinese Office Action issued in connection with related CN Application No. 201480028735.3 dated Sep. 5, 2016.

A Japanese Office Action issued in connection with related JP Application No. 2012269895 dated Oct. 4, 2016.

A Japanese Office Action issued in connection with related JP Application No. 2013027200 dated Oct. 18, 2016.

A Chinese office action issued in connection with related CN Application No. 201480067368.8 dated Nov. 2, 2016.

A Japanese Office Action issued in connection with related JP Application No. 2016513961 dated Nov. 8, 2016.

A Japanese Notice of Allowance issued in connection with related JP Application No. 2013027200 dated Nov. 29, 2016.

A Japanese Search Report issued in connection with related JP Application No. 2016029448 dated Jan. 25, 2017.

A Japanese Notice of Allowance issued in connection with related JP Application No. 2016513961 dated Feb. 21, 2017.

A Japanese Search Report issued in connection with related JP Application No. 2012269895 dated Mar. 21, 2017.

* cited by examiner

SHROUD HANGER ASSEMBLY

CROSS-REFERENCE TO RELATED DOCUMENTS

The present application is a national stage application under 35 U.S.C. § 371(c) of prior filed PCT application serial number PCT/US15/27247, filed on 23 Apr. 2015, which claims priority to U.S. Provisional Patent Application Ser. No. 62/011,231 titled "Shroud Hanger Assembly" of Jason David Shapiro, et. al., filed on 12 Jun. 2014, the disclosures of which are incorporated by reference herein.

TECHNICAL FIELD

The present embodiments relate to a shroud hanger assembly for use in a gas turbine engine. More specifically, present embodiments relate to, without limitation, a shroud hanger assembly including features to improve retaining of a shroud therein.

BACKGROUND

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

Due to operating temperatures within the primary flowpath of the gas turbine engine, it may be beneficial to utilize materials that have high temperature capability and do not require large amounts of cooling air. The higher operating temperatures within the engine improve the engine cycle thermal efficiency if the air used to cool the flowpath parts can be reduced. For example, to operate efficiently in such strenuous temperature and pressure conditions, composite materials have been suggested due to their superior temperature capability over metallic materials. In particular, ceramic matrix composites (CMC) materials are an ideal material for high temperature flowpath applications. Although CMC materials have higher temperature capability, they have a lower coefficient of thermal expansion than the metallic alloys which are used to support the CMC components and create sealing surfaces to the CMC components. Sealing is extremely important in order to retain the advantage that CMC materials have of reduced cooling air.

One use for the higher temperature material (CMC) is a turbine shroud. However, various problems are known to exist with the supporting metallic hardware (shroud hanger). For example, some assemblies utilize a one-piece hanger construction that is deflected apart during the insertion of the shroud into a cavity of the shroud hanger. This interference at assembly is required to maintain sealing throughout the engine cycle and, is due to the difference in coefficient of expansion of the metallic hanger and the CMC shroud. However, this mechanical deflection may cause bending or even yielding of the hanger arms during positioning of the shroud which is undesirable and may cause premature deformation and leakage at high temperature. Therefore, it may be beneficial to have an assembly which is more easily assembled and will not cause yielding of the hanger.

It may be beneficial to overcome the thermal differences and provide a hanger and shroud which is more easily assembled. It may also be beneficial to reduce hanger and shroud stress caused by the thermal differences while maintaining sealing between the two parts; therefore it may also be beneficial to better thermally match the metallic support to the composite shroud.

The information included in this Background section of the specification, including any references cited herein and any description or discussion thereof, is included for technical reference purposes only and is not to be regarded subject matter by which the scope of the invention is to be bound.

SUMMARY

A shroud hanger assembly or shroud assembly is provided for dimensionally incompatible components such as those which are press or frictionally fit to engage one another. The assembly includes a multi-piece hanger, for example having a forward hanger portion and a rearward hanger portion. A cavity is formed between the parts wherein a shroud may be positioned which is formed of a low coefficient of thermal expansion material. The hanger and shroud may be formed of the same material or differing materials in order to better match the thermal growth between the hanger and the shroud. When the shroud is positioned within the hanger opening or cavity, one of the forward and rearward hanger portions may be press fit or otherwise connected into the other of the forward and rearward hanger portion.

According to some embodiments, a shroud hanger assembly for dimensionally incompatible components comprises a multi-piece shroud hanger formed of a first material, the shroud hanger having a forward hanger portion and a rearward hanger portion. A shroud may be formed of a low coefficient of thermal expansion second material, the shroud disposed between the forward hanger portion and the rearward hanger portion, wherein at least one of the forward hanger portion and the rearward hanger portion apply an axial interference force on the shroud.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of the present invention is provided in the following written description of various embodiments of the invention, illustrated in the accompanying drawings, and defined in the appended claims. Therefore, no limiting interpretation of the summary is to be understood without further reading of the entire specification, claims and drawings included herewith.

BRIEF DESCRIPTION OF THE ILLUSTRATIONS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Embodiments of a shroud hanger assembly are depicted in FIGS. 1-9. The hanger assembly includes a one-piece or multi-piece hanger including at least two legs which are formed of a first material. A shroud is positioned within a shroud hanger cavity and the multi-piece hanger may be constructed more easily due to the joinder of the first and second portions in the axial direction to provide an axial interference force on the shroud. The hanger may include at least one cooling cavity in order to inhibit thermal growth of the hanger and maintain clamping force on the shroud.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
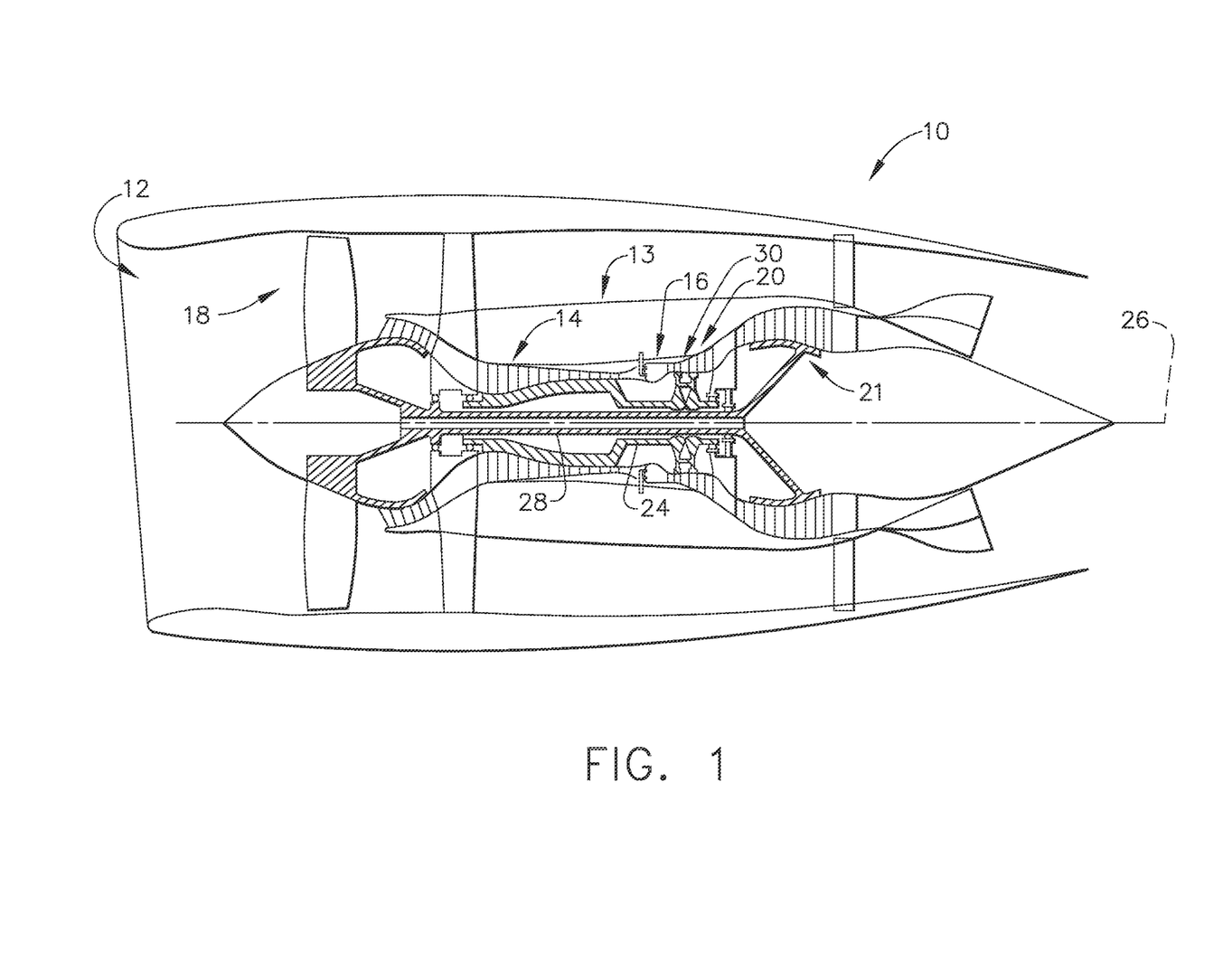
FIG. 1 side section view of an exemplary gas turbine engine.

Referring initially to FIG. 1, a schematic side section view of a gas turbine engine 10 is shown. The function of the turbine is to extract energy from high pressure and temperature combustion gases and convert the energy into mechanical energy for work. The gas turbine engine 10 has an engine inlet end 12 wherein air enters the core or propulsor 13 which is defined generally by a compressor 14, a combustor 16 and a multi-stage high pressure turbine 20 all located along an engine axis 26. Collectively, the propulsor 13 provides power during operation. The propulsor 13 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. The low pressure turbine 21 may also be utilized to extract further energy and power additional compressor stages.

A shroud hanger assembly 30 may be utilized to define a flow path adjacent to rotating parts such as turbine blades 22 (FIG. 2) of turbine 20, 21. The shroud hanger assembly 30 is shown schematically in the schematic FIG. 1 view. The assembly 30 may be disposed at a radially outward stationary end of the turbine 20, 21 above the rotating turbine blades 22 or the blades of the compressor 14.

Figure 2:
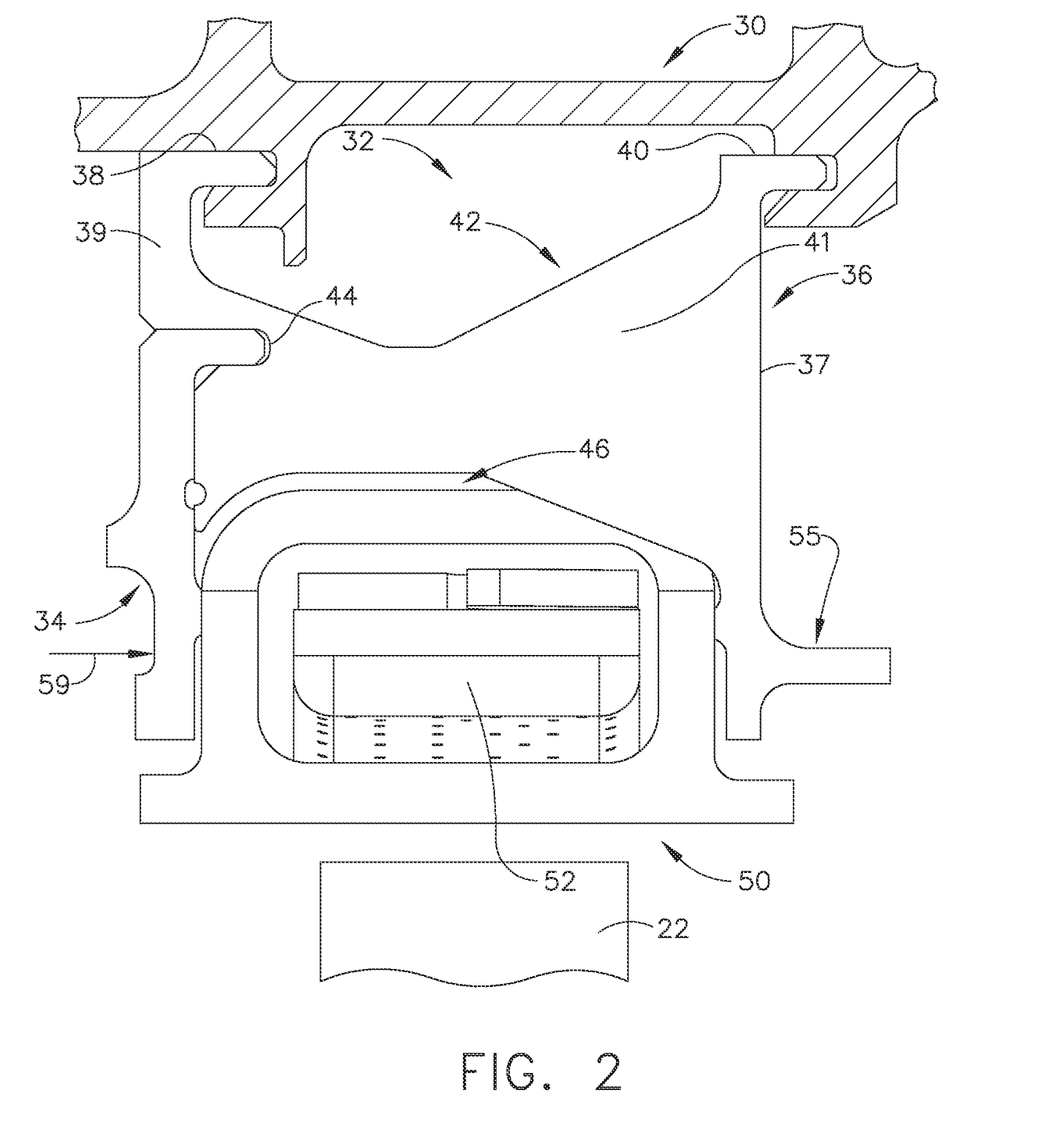
FIG. 2 is an end section view of an exemplary shroud hanger assembly.

Referring now to FIG. 2, an end section view of an exemplary shroud hanger assembly 30 is depicted and depending from an engine casing. The assembly 30 involves dimensionally incompatible components. The phrase "dimensionally incompatible" refers to components which may have an interference fit with one another and which may have thermal growth rates of differing amounts or coefficients of differing values. The assembly 30 includes a multi-piece hanger 32 having a first portion 34 and a second portion 36 which define the hanger 32. The hanger 32 includes first and second tabs 38, 40 which are utilized to connect the assembly 30 to an engine casing. The hanger 32 extends circumferentially about the engine axis 26 such that a plurality of segments are positioned together to define an entire circumferential assembly about the engine. Extending between the first tab and the second tab 38, 40 is a hanger ceiling or web 42 which extends between the first hanger portion 34 and the second or rearward hanger portion 36. The hanger ceiling 42 may be linear, curvilinear or may be defined by more than one linear segment. Depending from the tabs 38, 40 are legs 39, 37. The legs 39, 37 may or may not define parts of the first portion 34 and the second portion 36. The first tab 38 and leg 39 extend above a chordal groove 44 which extends from one circumferential end of the hanger 32 to the opposite end. The groove 44 allows for the first portion 34 to be press fit into the second portion 36.

The shroud hanger 32 may be formed of a metallic material with a relatively high coefficient of thermal expansion as compared to the shroud 50. Alternatively, the hanger 32 may be formed of a relatively low coefficient of thermal expansion material.

Beneath the ceiling 42 and the first portion 34 and the aft second portion 36, is a cavity 46 wherein a shroud 50 is positioned. The shroud 50 may be formed of a low coefficient of thermal expansion material which may differ from the hanger 32. The shroud 50 may be of various types including closed top and open top and may further comprise an impingement baffle 52 positioned within the shroud and in flow communication with cooling apertures or channels extending through the hanger 32 to cool the shroud 50. One or more cooling apertures or channels 33 (FIG. 3) may extend through either or both of the first hanger portion 34 and the second hanger portion 36 to provide flow communication to the impingement baffle 52 for cooling of shroud 50. According to the exemplary embodiments, the cooling apertures 33 may extend through the first hanger portion 34 into a cavity between the first and second hanger portions 34, 36. However, the apertures may alternatively extend through the leg 39 of the second portion 36.

Figure 3:
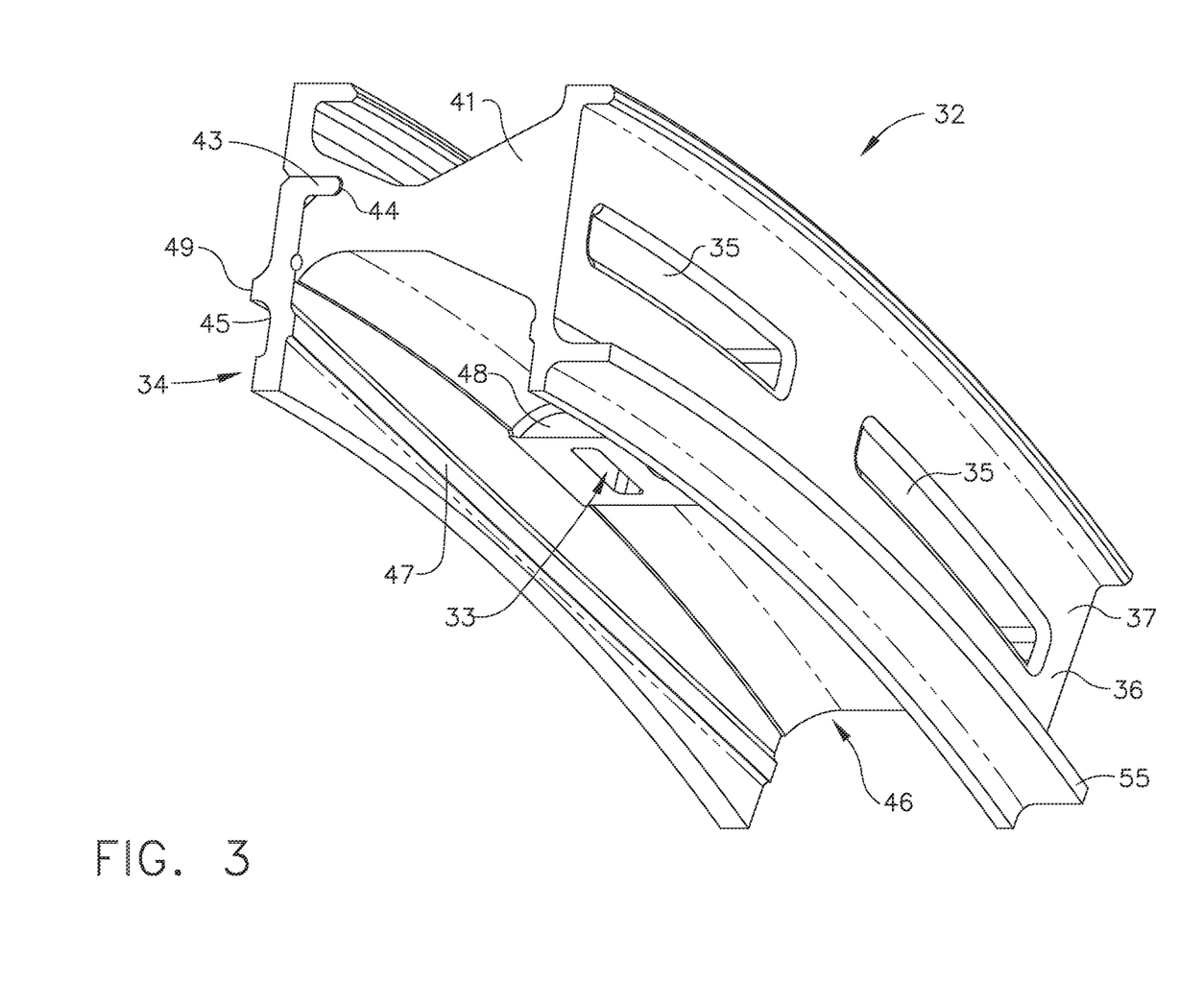
FIG. 3 is a lower perspective view of a multi-piece hanger.

Referring now to FIG. 3, a lower perspective view of the hanger 32 is depicted with the shroud 50 removed to reveal interior portions of the hanger 32. The hanger 32 depicted is a two-piece structure however, multi-piece structures may be used with additional portions. The forward portion 34 includes a chordal interface rib 43. The chordal interface rib 43 extends into a chordal groove 44. The interface between the hanger second portion 36 and the first portion 34 is chordal in order to improve bending stresses within the interface of the parts 34, 36 improving clamping force between first and second portions 34, 36 when thermal growth occurs. According to the instant embodiments, the second hanger portion 36 is the main body of the hanger 32 and the first hanger portion 34 which is cantilevered from the second portion 36. The first portion 34 applies an axial force to capture the shroud 50 within the cavity 46 of the hanger 32. However, according to alternate embodiments, the main body of the hanger 32 that is the larger portion may be defined by a forward portion and the opposite second portion may define a cantilevered leg or smaller portion of the hanger as a whole.

The first hanger portion 34 includes the chordal interface rib 43 and a spring leg 45. The chordal interface rib 43 extends chordally rather than circumferentially. The spring leg 45 has a forward surface and an aft surface and includes a chordal interference rib 47 on the aft side of the spring leg 45. The chordal interference rib 47 provides an engagement surface for engagement with the shroud 50. Further, one or more ribs 49 may be located on the forward side of the leg 45 to provide engagement surfaces or grinding surfaces so as to adjust the forward-aft dimension, location and force applied to the shroud 50.

It should be understood that while in some circumstances the chordal ribs and/or grooves may be utilized, in other circumstances it may be beneficial to utilize circumferential ribs and grooves for sealing or some other geometry which may or may not include some combination of the circumferential and chordal designs.

The leg 45 functions as a spring to provide an axial force on the shroud 50. The shroud 50 may be slightly larger than the cavity between first and second hanger portions 34, 36. Thus, due to this oversizing or dimensional incompatibility, when the first hanger portion 34 is installed with shroud 50 in position, a force is applied on the leg 45 which applies a reactionary axial retaining force on the shroud 50. The chordal interface rib 43 allows for axial movement of the portion 34, to install the portion 34 into the portion 36 and apply the retaining force, rather than bending and possibly yielding the hanger 32.

During operation of the engine 10, the shroud 50 and hanger 32 may thermally expand. In light of the interference fit between shroud 50 and the hanger leg 39 (FIG. 2), when the second portion 36 grows an amount in the axial direction, and due to the differing coefficients of thermal growth causing growth at differing rate than shroud 50, some axial clamping force on the shroud 50 may be reduced. The instant embodiment however, improves or maintains a more consistent clamping force on the shroud 50. Additionally, the chordal groove 44 and chordal interface rib 43 extend linearly rather than arcuately to provide such improved function at operating temperature. Moreover, as described further, the hanger 32 may have one or more cooling cavities 35 to limit axial growth and thereby maintain axial clamping force on the shroud 50. Accordingly, the assembly 30 provides a means of controlling axial growth or alternatively stated, matching axial growth of shroud 50 so that clamping force is maintained at desirable levels.

The second hanger portion 36 includes an aft wall 37 and slash face wall 41 which extend from the aft end of the hanger 32 to the forward end for engagement with the first hanger portion 34. Within the aft wall 37 is at least one cooling pocket or cavity 35 to provide cooling air into the hanger 32. Local cavities or pockets 35 allow the cooler second stage air to lower the hanger bulk temperature and reduce axial growth mismatch with the shroud 50. The cavities 35 extend into the shroud cavity 46 area but do not allow flow communication therebetween. Instead, these cooling cavities 35 merely provide cooling air toward the interior of the hanger without allowing passthrough of the cooling air to the shroud 50. The cavities cool the under surface of ceiling 42 (FIG. 2), as well as overall temperature of the hanger to aid with controlling axial growth.

Figure 4:
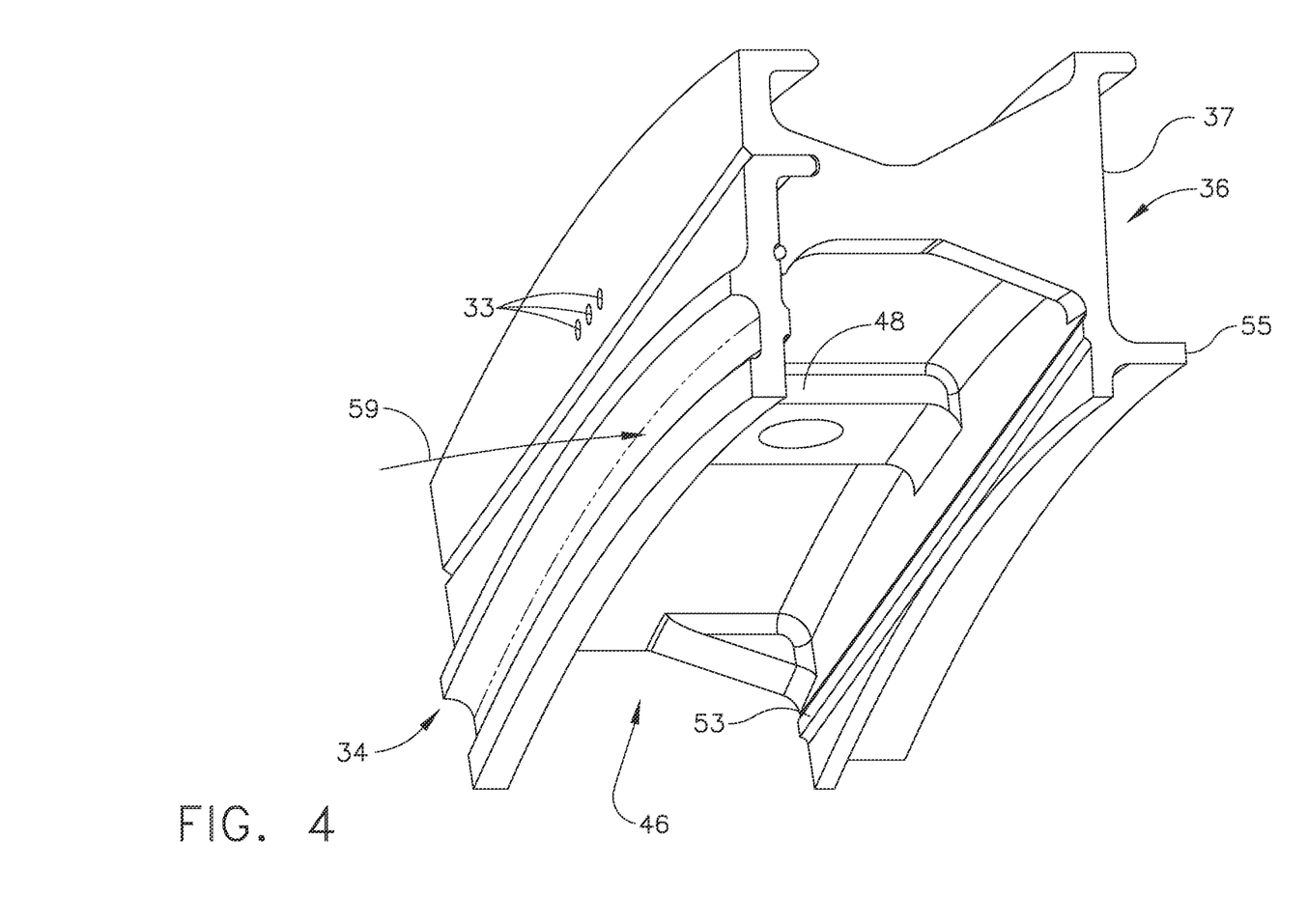
FIG. 4 is a lower perspective view of an exemplary multi-piece hanger from an alternate angle.

The view also depicts a cooling channel 33 which is in fluid communication with cooling air on the forward outside of the hanger 32 and which provides air to an impingement baffle 52 (FIG. 2) for cooling the shroud 50. The cooling channel 33 is shown in FIG. 4 as well, as extending through first portion 34. The cooling channel 33 may be located at various locations of the hanger 32 and although it's shown in one centered location, the channel 33 may be located at various locations in the circumferential direction of the assembly 30 corresponding to flow paths in communication with the impingement baffle 52. The end wall or slash face wall 41 may include one or more slots for receiving slash face seals (not shown) so that air leakage between adjacent hangers 32 may be limited.

While two cavities 35 are shown in the second hanger portion 36, various numbers of cavities may be used or a single cavity may be used and the lengths may vary in order to tune the desired amount of cooling.

Referring now to FIG. 4, a lower perspective view of the hanger 32 is shown from a different angle than FIG. 3 so as to reveal the forward surface of the second hanger portion 36. Similar to the first spring leg 45, the second leg 37, which also defines an aft wall, has a forward surface including a chordal interference rib 53. Extending from the second leg 37 toward the forward portion of the second hanger portion 36 and near the interface with the first hanger portion 34, is a boss 48 which allows for positioning of a bolt or fastener to retain the shroud and/or baffle 50, 52.

When the shroud 50 is inserted into the cavity 46, the first hanger portion 34 functions as a spring and is flexed outwardly to accommodate positioning of the shroud 50 between the first and second portions 34, 36. According to the exemplary embodiment for assembly 30, the forward hanger portion 34 is press fit into the second hanger portion 36 by pressing the chordal interface rib 43 into the chordal groove 44. The forward hanger portion 34 acts as a conformal spring as previously discussed to clamp the shroud 50 providing an axial force against the shroud 50 and retaining the shroud 50 between the first portion 34 and second portion 36. The press fit between the first portion 34 and the second portion 36 provides sealing along the forward and aft faces of the shroud hanger 32 and more uniform contact in clamp force, that is axial force, between the parts.

The aft wall 37 may further comprise a flange 55 which may support an aft stage nozzle. In operation, the nozzle load 59 may be transferred into the first hanger portion 34 through the shroud 50 and into the aft or second hanger portion 36 then onto the turbine engine case. This is represented by arrow 59 in FIGS. 2 and 4. The flange 55 may be aligned in an axial direction with an interface rib 53 or may be offset some radial distance. Similar to chordal interference rib 47, the rib 53 is chordal and engages shroud 50 when assembled.

Figure 5:
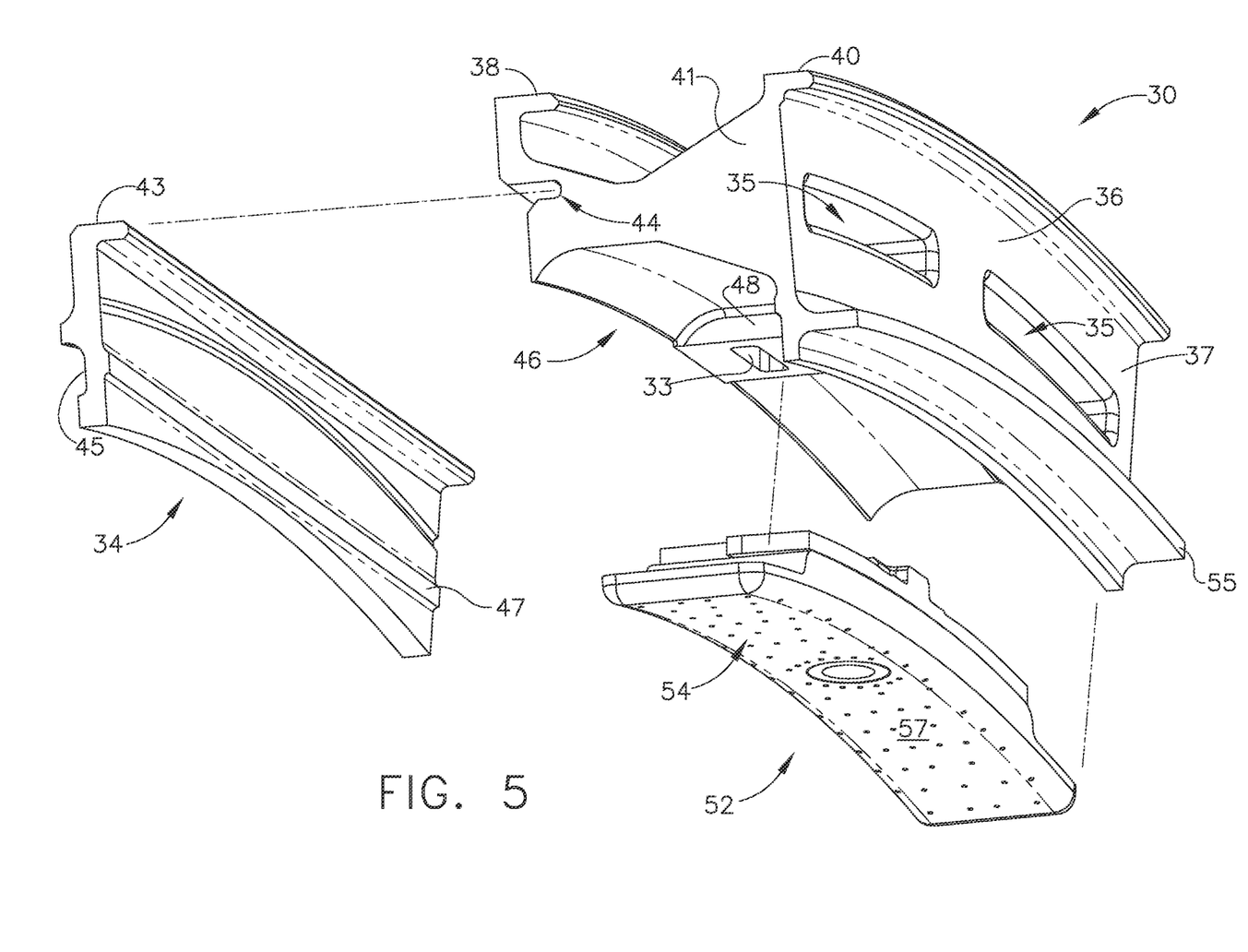
FIG. 5 is an exploded perspective view of the exemplary shroud hanger assembly.

Referring now to FIG. 5, an exploded perspective view of the shroud hanger assembly 30 is depicted. In the embodiment shown, the first hanger portion 34 is exploded from the second hanger portion 36. The first portion 34 includes the chordal interface rib 43 which is shown removed from the interface groove 44 of the second hanger portion 36. The chordal interface rib 43 is chordal as shown so as to engage a chordally extending groove 44 in the first portion 34 and beneath the tab 38. The embodiment functions such that when the chordal interface rib 43 is inserted in an axial direction into the groove 44 and when the shroud 50 (FIG. 2) is inserted into the cavity 46, the spacing of the chordal interference rib 47 from the chordal interface rib 43 causes engagement of the shroud or moment or cantilever bending of the first portion 34 from the second portion 36. The second portion 36 is also shown, and the hanger 32 is formed by the first portion 34 and second portion 36 which are joined in either a chordal or circumferential cut.

The second hanger portion 36 may also have the boss or projection 48 which is depending from the web 42. The projection 48 is depicted centrally in the circumferential direction of the second hanger portion 36. However, the projection 48 may be moved in circumferential directions or alternatively, two or more projections 48 may be utilized for flow communication with the baffle 52.

The second hanger portion 36 includes an aft wall 37 having at least one cooling cavity 35. In the depicted embodiment, there are two cooling apertures 35. These are generally rectangular in shape, wherein the long walls of the cooling cavity 35 are generally circumferential and matching the circumferential bend of the second portion 36 between the end walls 41. Alternatively, these one or more cooling cavities 35 may be other polygonal shapes and may or may not include curved corners as depicted, and which provide improved air flow characteristics into the pocket. One or more of these projections 48 may include the cooling aperture 33 for flow communication of cooling air to the baffle 52.

Additionally shown beneath the cavity 46, is the impingement baffle 52. The baffle 52 is in flow communication with the cooling aperture 33. The baffle 52 defines a flow volume with a plurality of cooling holes 54 on a lower surface 57 thereof. The cooling air enters the baffle 52 from the cooling aperture 33 above and is dispensed through the volume so that the air exits the plurality of cooling holes 54 along the bottom of the baffle surface 57. The plurality of baffle apertures 54 provide cooling air to the shroud 50 (FIG. 2) depicted in the assembled view.

Figure 6:
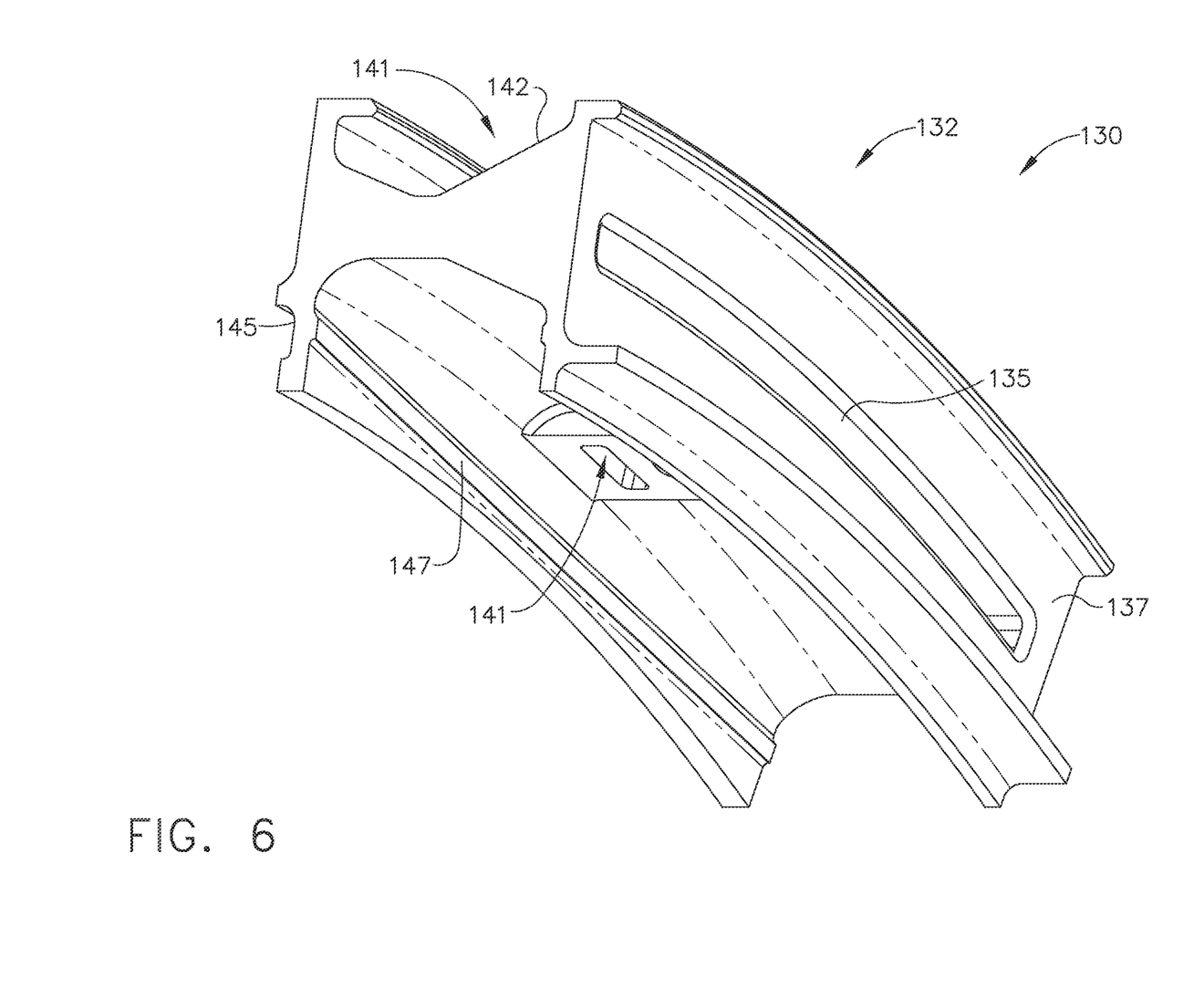
FIG. 6 is a perspective view of an alternate embodiment of a shroud hanger assembly.

Referring now to FIG. 6, a perspective view of an alternative shroud hanger assembly 130 is depicted. The shroud hanger 132 allows for use of dimensionally incompatible components which may utilize clamping, interference or friction force in order to retain position desired relative to one another. The shroud hanger 132 includes a first leg 145 and a second leg 137 as in the previous embodiment, as well as a ceiling or web 142 extending therebetween. The hanger 132 differs from the previously described embodiments as the instant shroud hanger 132 is formed of a single structure rather than multiple portions. The first leg 145 is depicted as a forward leg relative to the air flow through the engine and the second leg 137 is an aft leg which is positioned downstream relative to the air flow of the first leg 145. The shroud hanger 132 may be formed of a single circumferential structure which extends about the axis of the engine or alternatively, may be formed of multiple segments as depicted in the exemplary embodiment. A slash face or end wall 141 may be located at circumferential ends of the hanger 132.

The shroud hanger 132 may be formed of a first material which may be metallic or may be some material having a low coefficient of thermal expansion. Such materials include, but are not limited to, ceramic matrix composite, which may have beneficial characteristics. The hanger 132 includes a cooling channel 133 to direct cooling air flow to a baffle 52 (FIG. 5) for cooling a shroud.

Also shown at the aft end of the shroud hanger assembly 130, is at least one cooling cavity 135 extending into the second leg 137 of the shroud hanger 132. The cooling cavity 135 allows access of cooling air into the hanger in order to limit thermal growth of the shroud hanger 132. Thus, by limiting or reducing the thermal growth, the hanger may be more closely matched or the growth limited in order to maintain the clamping force on a shroud located therein. While the instant embodiment depicts a single cooling cavity 135, two or more cavities may be utilized. Additionally, according to this or other embodiments, the cavities may have a plurality of shapes which are circumferential, chordal or otherwise shaped, such as polygonal or curvilinear.

Figure 7:
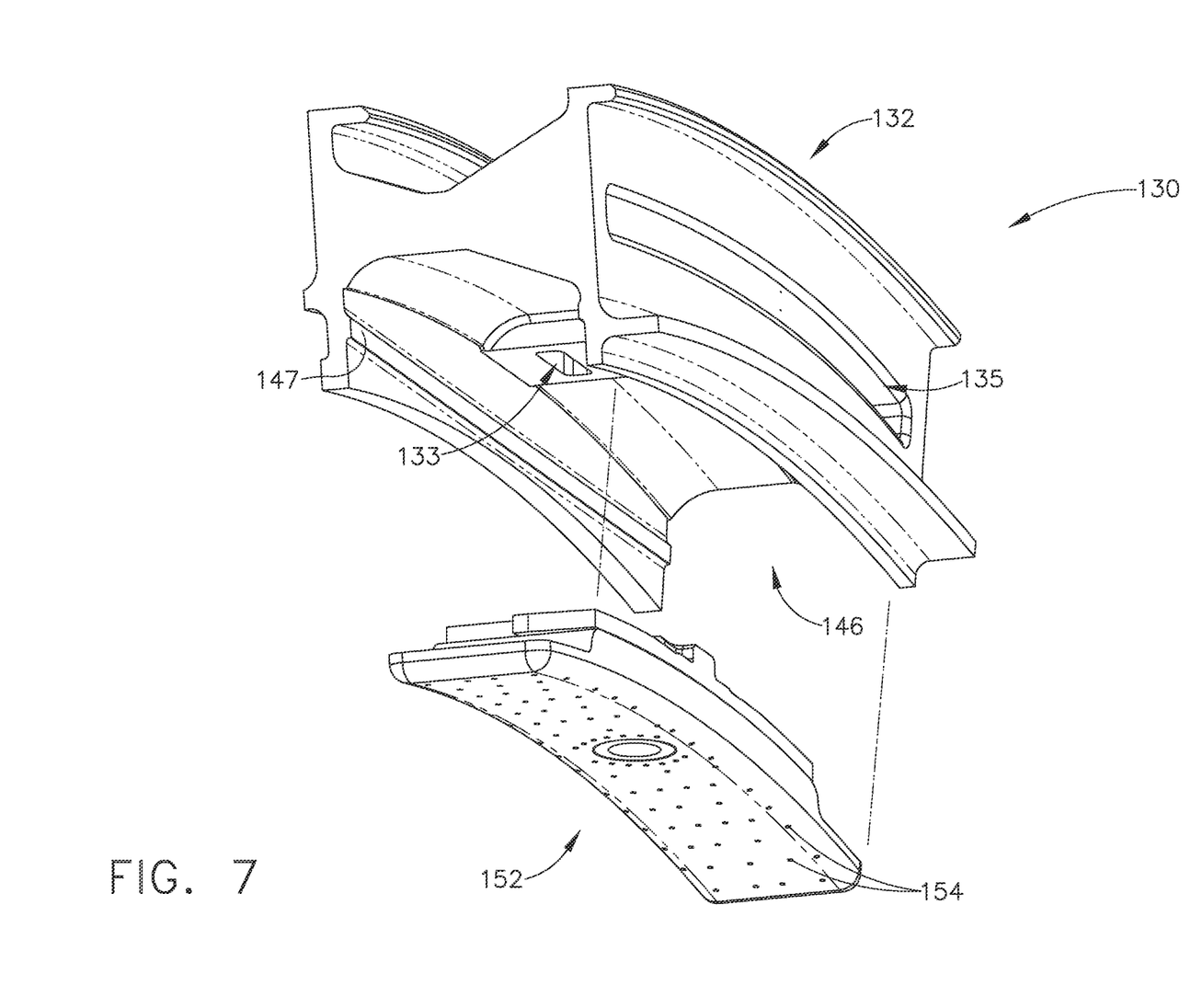
FIG. 7 is an exploded perspective view of the assembly of FIG. 6.

Referring now to FIG. 7, an exploded perspective view of the alternate embodiment hanger assembly 130 is depicted. The hanger 132 is a one-piece hanger rather than a multi-piece hanger as with the earlier embodiments. In the instant embodiment, the cooling cavity 135 is formed of a single, generally rectangular shaped opening with circumferentially extending sidewalls for the long opening of the rectangular shape. Additionally, at the corners, the substantially rectangular shaped cooling cavity 135 has curved rather than sharp edges. This may improve cooling flow into or out of the cooling cavity 135. While a single opening is shown defining the cooling cavity 135, it is within the scope of the present disclosure that the cavity 135 be formed of two or more openings which may vary in shape. The openings may be rectangular, square shaped, polygonal or have linear or curvilinear walls. Alternatively or additionally, walls may be chordal or circumferential. These polygon shaped cooling cavities may additionally have curved corners to aid in air flow and manufacturing of the part. In other embodiments, the at least one cooling cavity may be curvilinear and not a specific polygonal shape. Additionally, the depicted at least one cooling cavity 135 may extend in a purely axial direction into the shroud hanger 132 or may extend at an angle to the axial direction. Additionally, the cavity 135 may extend in a combination of axial and non-axial directions so that the cavity 135 is not purely linear in extending into the shroud hanger 132. In short, various alternatives are well within the scope of these embodiments and the depicted cooling cavity 135 should not be considered limiting.

The cooling cavity 135 as previously described limits the amount of growth of the hanger 132 in the axial direction and therefore, improves retaining of the shroud (not shown) within the cavity 146 of the hanger 132.

Additionally, an impingement baffle 152 is depicted which directs or guides air flow from an at least one cooling channel 133 extending through the shroud hanger 132 to provide impingement flow to the shroud. The depicted baffle 152 includes a plurality of holes 154 along a lower surface and the baffle 152 is in flow communication with at least one cooling aperture 133 extending through the hanger 132. As a result, air is diffused through the baffle 152 and passes through the holes 154 to cool a shroud which surrounds the baffle 152.

The shroud (not shown) is held in place within the cavity 146 by interference rib 147. As with the previous embodiments, the shroud (not shown) may be formed of a second material. The second material may be a low coefficient of thermal expansion material which is the same or different from the material used to form the shroud hanger. The shroud provides an inner flow path surface for the rotor and adjacent turbine blade 22 (FIG. 2) of turbine 20, 21. The shroud may be an opened top or U-shaped shroud or alternatively, may be a closed top shroud as will be understood by one of ordinary skill in the art. In this embodiment, the cooling cavity 135 more accurately controls the axial growth of the hanger 132 and therefore, provides a more controlled clamping force on a shroud despite the difference in materials and/or the difference of coefficient of thermal expansion.

The at least one cooling cavity 135 may be located along the aft leg of the shroud hanger 132. Alternatively, the at least one cooling cavity 135 may be formed of two or more cavities. The cavities may be formed of various shapes which have sides that are chordal or arcuate in shape. In the exemplary embodiment, at least one cavity is shown as a polygon shaped, specifically rectangular with curved corners but other shapes may be utilized.

Figure 8:
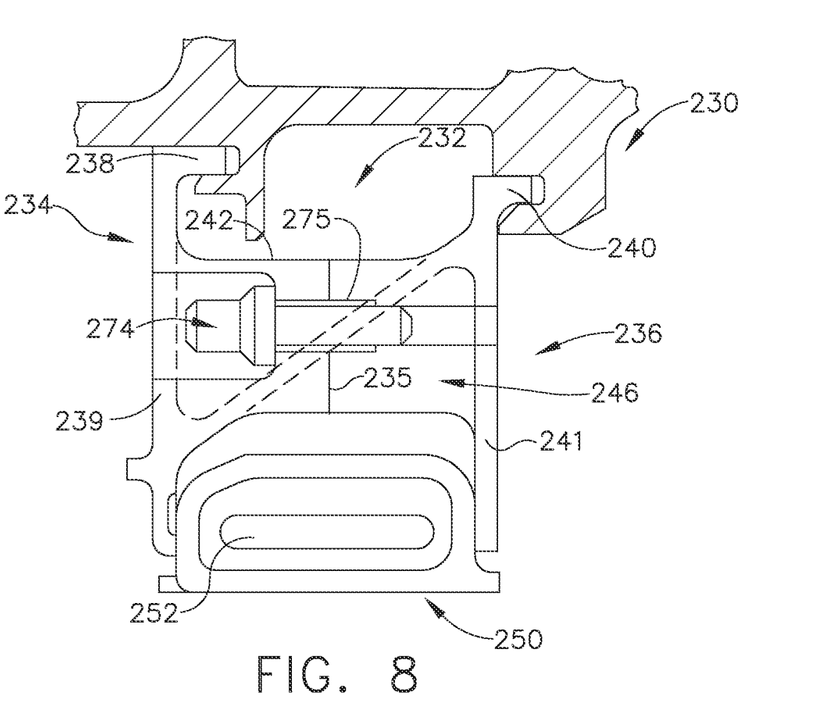
FIG. 8 is a side section view of a further embodiment of a multi-piece hanger; and, FIG. 9 is a side section view of still a further embodiment of a multi-piece hanger.

Referring now to FIG. 8, an additional embodiment of a hanger assembly is provided for purpose depicting additional configurations for multi-piece hanger assemblies 230. The hanger assembly 230 is shown in a side-section view. The hanger assembly 230 includes a hanger 232 formed of a first portion 234 and a second portion 236. The first portion 234 and second portion 236 are split along line 235. The split line extends circumferentially and may be centered or off center in the axial direction. The first portion 234 may be at the forward end and the second portion 236 may be at the aft end of the hanger 232. These hanger portions 234, 236 may be connected in axial directions or alternatively, in radial directions so that one of the first and second hanger portions 234, 236 is captured by the second of the first and second hanger portions 234, 236. Additionally, the engine casing may be utilized to capture one or both of the hanger portions 234, 236 in order to aid in building the assembly 230. Either or both of the first and second hanger portions 234, 236 may include one or more tabs 238, 240 for connecting the hanger 232 to the engine casing. A variety of arrangements may be utilized to define the multi-piece hanger 232 and the exemplary embodiment is merely one such embodiment which may be utilized in combination with additional embodiments shown herein. Accordingly, the exemplary hanger 232 should not be considered limiting as other forms of multi-piece hangers may be substituted and are to be considered within the scope of the instant disclosure. For example, according to some embodiments, the hanger 232 may be split 235 centrally or off-center and may split apart in axial directions or in radial directions.

Depending from the tabs 238, 240 are legs 239, 241. The legs 239, 241 may depend radially at an angle to a radial direction or some combination. A web 242 is depicted extending between the first leg 239 and the second leg 241. The web, first leg and second leg 242, 239, 241 may all be formed of both of the first and second hanger portions 234, 236 or alternatively, may be formed of either of the first portion 234 or second portion 236. The web 242 may extend in an axial direction or alternatively, may be angled from the forward leg 239 to the aft leg 241 or some combination depending on the circumferential location along the web 242. Thus, this configuration may vary within a single part depending on where the section of the part is taken. Between these legs 239, 241 is a cavity 246 wherein a shroud 250 may be positioned. The shroud 250 may be formed of a low coefficient of thermal expansion material which differs from that of the hanger 232. According to some exemplary embodiments, the hanger 232 may be formed of a metallic material such as an alloy which has a relatively higher coefficient of thermal expansion than the material of the shroud 250 which has a relatively lower coefficient of thermal expansion. For example, the shroud 250 may be formed of ceramic matrix composite material (CMC) but is not limited to such embodiment. Accordingly, during operation, the hanger 232 will grow at a thermal rate which is greater than that of the shroud 250. The shroud 250 may take various forms according to the embodiments described herein. For example, the shroud 250 may be a closed top shroud as depicted, meaning the upper portion of the shroud is generally closed. Such closed top may be horizontal, angled, a combination, curvilinear or other forms to substantially close the shroud 250. Alternatively, the shroud 250 may comprise an open top shroud which may be generally u-shaped according to other embodiments or other such shapes in which the top of the shroud is open rather than closed. Within the shroud 250 may be a baffle or insert 252 which cools a surface of the shroud 250. The baffle or insert 252 may be in flow communication with one or more cooling apertures or channels (now shown) to provide cooling over to the shroud 250. The baffle or insert 252 spreads the air in axial and circumferential directions to provide this cooling.

Referring again to the hanger 232, the present embodiment utilizes a bolt 274 which extends axially through the first hanger portion 234 and the second hanger portion 236. The axial bolt 274 may extend through one or more aligned sleeve 275 in the first and second hanger portions in order to retain the alignment of the first and second hanger portions 234, 236. The sleeves 275 may be of same or differing diameters. According to the instant embodiment, the bolt 274 may extend from the forward to the aft direction. However, according to alternate embodiments, the bolt 274 may extend in an opposite aft to forward direction.

Figure 9:
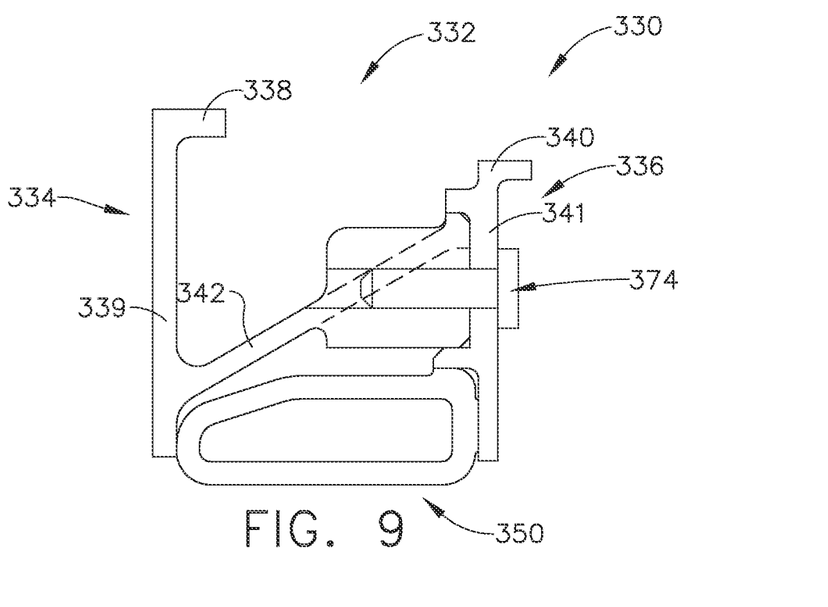

Referring now to FIG. 9, such alternate embodiment of the shroud hanger assembly 330 is depicted in side-section view. The hanger 332 includes a first hanger portion 334 and a second hanger portion 336 wherein the heights of legs 339, 341 defining these structures may be equal or differ. According to the exemplary embodiment, the first tab 338 is at a higher position than the second tab 340 but this is merely exemplary and may be reversed such that the aft tab 340 is higher than the forward tab 338. The web 342 extends between the first leg 339 and the second leg 341 defining a location where shroud 350 may be positioned. A bolt 374 extends from an aft direction toward the forward direction, opposite the previous embodiment. The bolt 374 may define a locating structure for connection of the hanger portions 334, 336.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A shroud hanger assembly for dimensionally incompatible components, comprising:
a multi-piece shroud hanger formed of a first material, said multi-piece shroud hanger having a forward hanger portion and a rearward hanger portion defining a cavity therebetween, the multi-piece shroud hanger further comprising a linearly extending chordal interface rib on at least one of said forward hanger portion or said rearward hanger portion for engagement with the other of said forward hanger portion and said rearward hanger portion; and
a shroud formed of a low coefficient of thermal expansion second material, said shroud disposed between said forward hanger portion and said rearward hanger portion, wherein the shroud has a first axial length, and wherein prior to the shroud being disposed between said forward hanger portion and said rearward hanger portion the cavity has a second axial length, wherein the first axial length is larger than the second axial length to force a cantilever bending of at least one of the forward hanger portion or the rearward hanger portion away from the cavity when the shroud is disposed between said forward hanger portion and said rearward hanger portion such that at least one of said forward hanger portion or said rearward hanger portion are configured to apply an axial interference force on said shroud.

2. The shroud hanger assembly of claim 1, wherein said multi-piece shroud hanger includes a bolted connection at least in part.

3. The shroud hanger assembly of claim 1, further comprising a circumferential shroud rib disposed on one of said shroud and said multi-piece shroud hanger for engaging said shroud with said shroud hanger assembly.

4. The shroud hanger assembly of claim 1, further comprising at least one cooling channel extending through one of said forward hanger portion and said rearward hanger portion of said shroud hanger assembly for impingement cooling of said shroud.

5. The shroud hanger assembly of claim 4, further comprising a baffle in flow communication with said at least one cooling channel.

6. The shroud hanger assembly of claim 1, wherein one of said forward hanger portion and said rearward hanger portion is larger than the other of said forward hanger portion and said rearward hanger portion.

7. The shroud hanger assembly of claim 1, further comprising end walls which increase stiffness of said rearward hanger portion.

8. The shroud hanger assembly of claim 1, wherein said forward hanger portion is connected to said rearward hanger portion at only one end of said forward hanger portion.

9. The shroud hanger assembly of claim 1, wherein said forward hanger portion and said rearward hanger portion apply said axial interference force to said shroud.

10. The shroud hanger assembly of claim 1, wherein the linearly extending chordal interface rib extends into a chordal groove.

11. The shroud hanger assembly of claim 10, wherein the chordal groove is beneath a tab.

12. The shroud hanger assembly of claim 4, further comprising a baffle in flow communication with said at least one cooling channel, the baffle defining a plurality of cooling holes.

13. The shroud hanger assembly of claim 12, wherein the plurality of cooling holes are defined by a lower surface of the baffle.

14. The shroud hanger assembly of claim 1, wherein the forward hanger portion comprises a second chordal interference rib on an aft side of the forward hanger portion that engages the shroud.

15. The shroud hanger assembly of claim 14, wherein the linearly extending chordal interface rib is on the aft side of the forward hanger portion.

16. The shroud hanger assembly of claim 14, wherein the rearward hanger portion comprises a third chordal interference rib on an aft side of the forward hanger portion that engages the shroud.

17. A shroud hanger assembly for dimensionally incompatible components, comprising:
a multi-piece shroud hanger formed of a first material, said multi-piece shroud hanger having a forward hanger portion and a rearward hanger portion defining a cavity therebetween, the multi-piece shroud hanger further comprising a linearly extending chordal interface rib on at least one of said forward hanger portion or said rearward hanger portion for engagement with the other of said forward hanger portion and said rearward hanger portion;

a shroud formed of a low coefficient of thermal expansion second material, said shroud disposed between said forward hanger portion and said rearward hanger portion, wherein the shroud has a first axial length, and wherein prior to the shroud being disposed between said forward hanger portion and said rearward hanger portion the cavity has a second axial length, wherein the first axial length is larger than the second axial length to force a cantilever bending of at least one of the forward hanger portion or the rearward hanger portion away from the cavity when the shroud is disposed between said forward hanger portion and said rearward hanger portion such that at least one of said forward hanger portion or said rearward hanger portion are configured to apply an axial interference force on said shroud; and at least one cooling cavity located in the forward hanger portion or the rearward hanger portion.

18. The shroud hanger assembly of claim 17, wherein the cooling cavity is arcuate in shape.

19. The shroud hanger assembly of claim 18, wherein the cooling cavity extends into the cavity defined between the forward hanger portion and the rearward hanger portion.

20. A shroud hanger assembly for dimensionally incompatible components, comprising:

a multi-piece shroud hanger formed of a first material, said multi-piece shroud hanger having a forward hanger portion and a rearward hanger portion defining a cavity therebetween, the multi-piece shroud hanger further comprising a linearly extending chordal interface rib on at least one of said forward hanger portion or said rearward hanger portion for engagement with the other of said forward hanger portion and said rearward hanger portion, wherein the forward hanger portion comprises a second chordal interference rib on an aft side of the forward hanger portion that engages the shroud, wherein the rearward hanger portion comprises a third chordal interference rib on an aft side of the forward hanger portion that engages the shroud, wherein said forward hanger portion is connected to said rearward hanger portion at only one end of said forward hanger portion, and wherein the linearly extending chordal interface rib is on the aft side of the forward hanger portion;

a shroud formed of a low coefficient of thermal expansion second material, said shroud disposed between said forward hanger portion and said rearward hanger portion, wherein the shroud has a first axial length, and wherein prior to the shroud being disposed between said forward hanger portion and said rearward hanger portion the cavity has a second axial length, wherein the first axial length is larger than the second axial length to force a cantilever bending of at least one of the forward hanger portion or the rearward hanger portion away from the cavity when the shroud is disposed between said forward hanger portion and said rearward hanger portion such that at least one of said forward hanger portion or said rearward hanger portion are configured to apply an axial interference force on said shroud; and at least one cooling cavity located in the forward hanger portion or the rearward hanger portion, wherein the cooling cavity is arcuate in shape, and wherein the cooling cavity extends into the cavity defined between the forward hanger portion and the rearward hanger portion.

* * * * *